United States Patent [19]
Perret

[11] 4,073,160
[45] Feb. 14, 1978

[54] TORQUE TRANSMITTING COUPLING

[75] Inventor: Claude Perret, Belley, France

[73] Assignee: Cefilac, Paris, France

[21] Appl. No.: 711,353

[22] Filed: Aug. 3, 1976

[30] Foreign Application Priority Data

Aug. 14, 1975 France .................. 75 25954

[51] Int. Cl.² .............. F16D 1/00; B25B 13/00
[52] U.S. Cl. ............................ 64/9 R; 85/45
[58] Field of Search .............. 64/9 R; 85/45, 9 R

[56]           References Cited
            U.S. PATENT DOCUMENTS

| 2,969,250 | 1/1959 | Kull ............... | 85/45 |
| 3,969,974 | 7/1976 | Lejdegard ............ | 85/45 |

FOREIGN PATENT DOCUMENTS 666,534   3/1965   Belgium ................ 85/9 R

*Primary Examiner*—Benjamin W. Wyche
*Assistant Examiner*—R. C. Turner
*Attorney, Agent, or Firm*—Dennison, Dennison, Meserole & Pollack

[57]            ABSTRACT

A high performance coupling intended to transmit a torque from a motor element to a driven element, each of the two elements having at least two teeth symmetrical in relation to the axis of rotation and having generatrices parallel to this axis, each tooth being constituted by flat surfaces symmetrical in relation to their bisecting plane and being connected by curved surfaces, characterized in that each tooth is provided with at least four flat surfaces, with at least two drive generatrices for a given direction of rotation and with at least two different angles of attack. This new coupling finds its application in the field of screws and nuts, and the corresponding spanners, and also for transmission connections and couplings and the necessary tools.

6 Claims, 11 Drawing Figures

TORQUE TRANSMITTING COUPLING

The invention relates to a new high performance coupling intended to transmit a torque from a motor element to a driven element.

In the description of the present invention and for the better understanding thereof, it is necessary to define certain terms employed in the field of the art.

By drive generatrix, we mean the ridge generated by the intersection of two adjacent planes parallel to the axis of rotation of one of the driving or driven elements, which enters into contact with a flat surface, having a generatrix parallel to the axis of rotation of the other element.

By angle of attack, we mean the acute angle formed by the plane bisecting one tooth and one of the flat faces of this tooth.

By "tooth apex" diameter, we mean the greatest "across teeth" diameter of the male element, whereas it concerns the smallest "across teeth" diameter of the female element.

By "tooth bottom" diameter, we mean the smallest diameter of the male element, while it concerns the greatest diameter of the female element.

For some time already, the specialized literature has offered the skilled man a coupling having a hexagonal configuration, permitting the transmission of a torque from one element to another, in which each element has six faces, six ridges, and six angles of 120°, measured between two adjacent faces.

Despite the undeniable qualities of such a coupling, the existence of certain major disadvantages has nevertheless been noted, which in certain applications make such a configuration of little use.

Thus, for example, because of the play which existed habitually between the two driving and driven elements and which resulted from manufacturing tolerances, the opposite surfaces of each of the two elements tended to converge at the moment when the torque was applied, instead of remaining parallel and therefore the contact established was not effected face against face but face against ridge. It is therefore evident that the forces generated by the torque were concentrated on point-like contact zones corresponding to drive generatrices.

Since each ridge was confused with each drive generatrix, at the outset of the application of the torque, the said stresses caused the rapid deterioration of these ridges and the displacement of the drive generatrices. There was then produced a relative slipping between the two elements and it became necessary to replace such a coupling.

Subsequently, to attempt to remedy such a disadvantage, it was proposed to provide such a coupling with a double number of surfaces, i.e., to have an assembly of which the number of "face-ridge" contacts of the driving and driven elements was therefore doubled and therefore of which the zone stresses were diminished by half in relation to the hexagonal coupling. However, the angle of attack was then more open, favoring a more rapid deterioration of the said ridges and thus caused the same slippage defect already found in the above-mentioned coupling.

Therefore, another configuration was proposed constituted by six grooves having rectangular faces distributed over the perimeter of the driven element, the driving element being provided with the same grooves complementary with the grooved surface of the driven element. This configuration has a low angle of attack, particularly favorable to the quality of the drive, but had only one drive generatrix per groove of the driven element and thus suffered the same disadvantages as the configuration having six sides, i.e., there was a number of drive generatrices equal to the number of grooves. Thus, when the torque was applied, there was created on the ridges an excessively high strain, giving rise to ridge deformation which favored the existence of an ever greater play between the two elements.

Subsequently, it was proposed to improve the six groove configurations by doubling the number thereof. But although the number of drive generatrices was thus increased from six to twelve and although the angle of attack was still very low, there nevertheless appeared disadvantages which in use proved unfortunate, such as an excessively small difference between the "tooth apex" and "tooth bottom" diameters. The result of this was the substitution of curved surfaces for the flat surfaces of the six groove coupling and as a result, the deformation of the said teeth and the relative slippage of the two driving and driven elements.

Finally, more recently, a six-lobed configuration has been proposed to the skilled man, consisting of a succession of curved surfaces, convex and concave, generated by radii of varying dimensions. Although this configuration presented substantial advantages which manifested themselves in a low angle of attack and a tooth depth which was measured by the difference between the tooth apex diameter and the tooth bottom diameter, there nevertheless were major disadvantages which made its utilization a sensitive matter. Among these disadvantages and in particular by virtue of the play necessary for the interlocking of the two elements, there appeared a prime disadvantage common to previous configurations which consisted in a number of drive generatrices equal to the number of lobes. Moreover, when it was a question of driving a screw head, it proved eminently desirable to use a special key, since the use of a conventional key, such as a flat key, proved inadequate.

Because of the above-mentioned disadvantages, a new high performance coupling has been perfected which eliminates these disadvantages.

According to the invention, the new high performance coupling intended to transmit the torque from a drive element to a driven element, each of the two elements having at least two teeth symmetrical in relation to the axis of rotation and having generatrices parallel to this axis, each tooth being constituted by flat surfaces symmetrical in relation to their bisecting planes and connected by curved surfaces is characterized in that each tooth is provided with at least four flat surfaces, at least two drive generatrices for a given direction of rotation and at least two different angles of attack.

The fundamental advantage represented by the teeth having at least four flat surfaces with respect to the teeth having rounded surfaces of the convex and concave type will be recognized. Indeed, because of the normal play resulting from the working tolerance of the elements in the six-lobed coupling, the contact between the two driving elements is effected on each lobe in accordance with a single "drive generatrix" whereas in the coupling according to the invention, there are two drive generatrices on each tooth.

Therefore, by virtue of the increase of the number of surfaces on the said teeth, i.e., by virtue of the increase of the number of drive generatrices, the zone stresses are reduced accordingly, permitting a remarkable improvement in the life of the said coupling.

Furthermore, when the teeth have four flat surfaces symmetrical in relation to their bisecting planes, it happens that the driving of the driven organ by the driving organ is effected according to two angles of attack $\alpha$ and $\beta$, which are different from one another, but always of small aperture, while in all the other configurations of the prior art, the said drive is produced by a single angle of attack.

Therefore, the combination of the angles of attack and the drive generatrices ensures the reduction of the zone forces by the division of the mechanical stress, and thus in itself, is the origin of the longevity and reliability of the coupling according to the invention.

In such a case, the angle $\alpha$ has a value between 58° and 62°, while the angle $\beta$ has a value between 10° and 30°, preferably between 15° and 25°.

According to a variant in which the teeth are constituted by six flat surfaces, symmetrical in relation to their bisecting planes, there ae three drive generatrices and three angles of attack, $\alpha$, $\beta$, and $\gamma$. In this case, the angle of attack $\alpha$ has a value of between 58° and 62°, the angle of attack $\beta$ has a value between 25° and 30°, while the angle of attack $\gamma$ has a value between 10° and 20°.

The invention will be better understood from the numbered description which can be given using the attached figures without these having any character of limitation.

Figure 8:
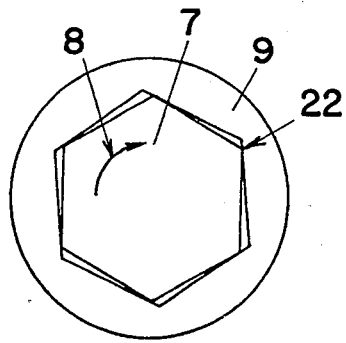
Figure 9:
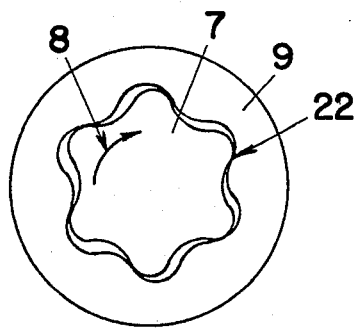
Figure 10:
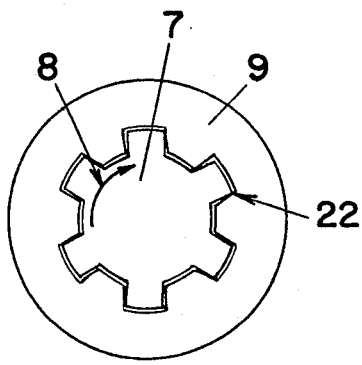
Figure 11:
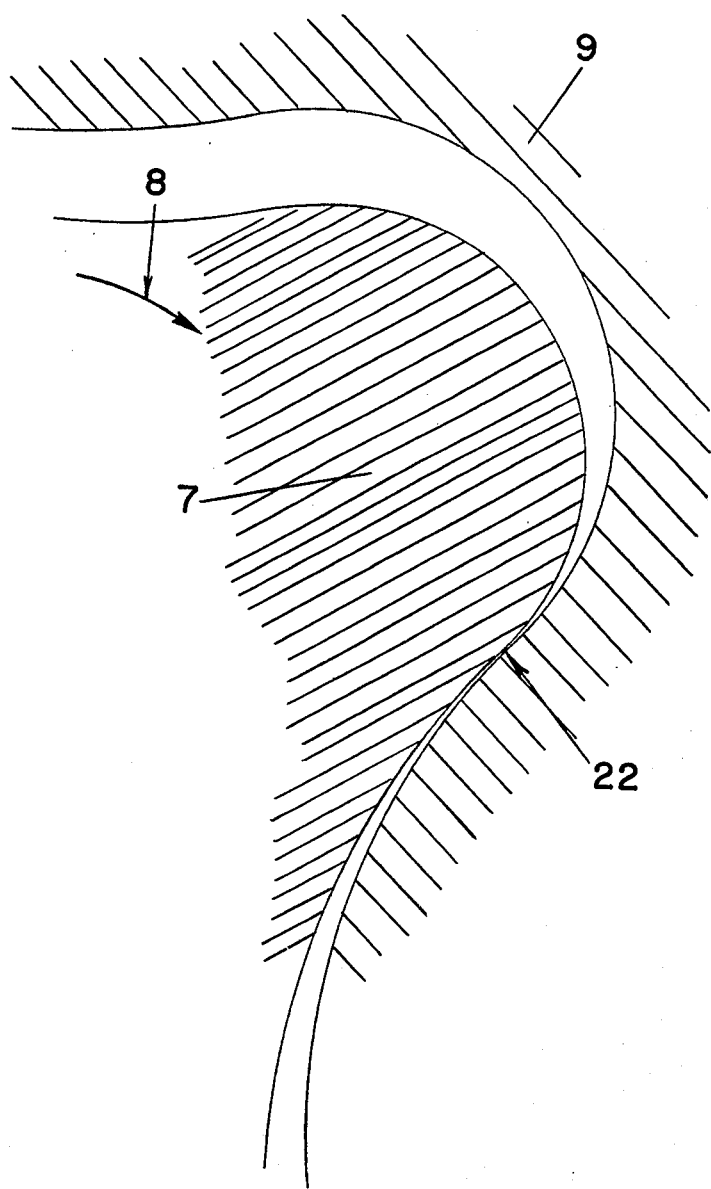

FIGS. 8, 9, and 10 show couplings of the prior art during the transmission of the said torque; and FIG. 11 shows an enlargement of one of the lobes of FIG. 9, during the transmission of the torque.

Figure 1:
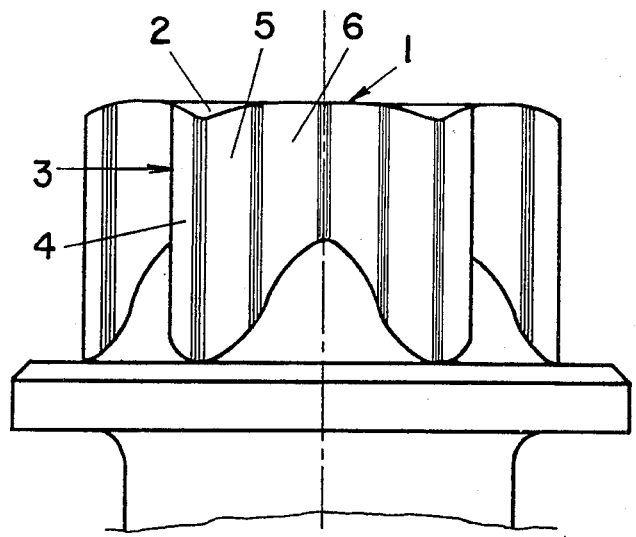
FIG. 1 is an elevation view of a male coupling element.

FIG. 1 shows a head 1, which comprises six teeth marked with the reference numeral 2, each being composed of four flat faces 3, 4 and 5 and 6.

Figure 2:
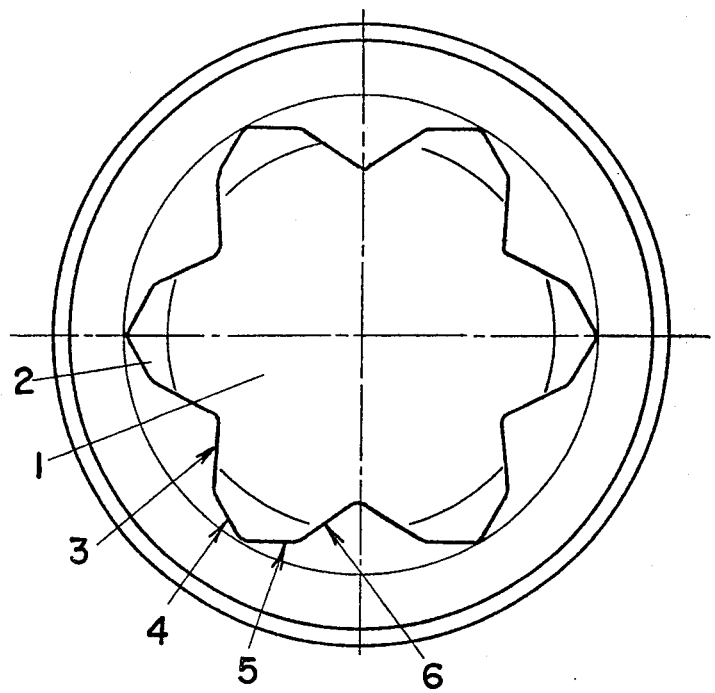
FIG. 2 is a plan view of the male coupling element of FIG. 1.

According to FIG. 2, seen from above the head 1, the six teeth and the four flat surfaces of each tooth have the same numbering.

Figure 3:
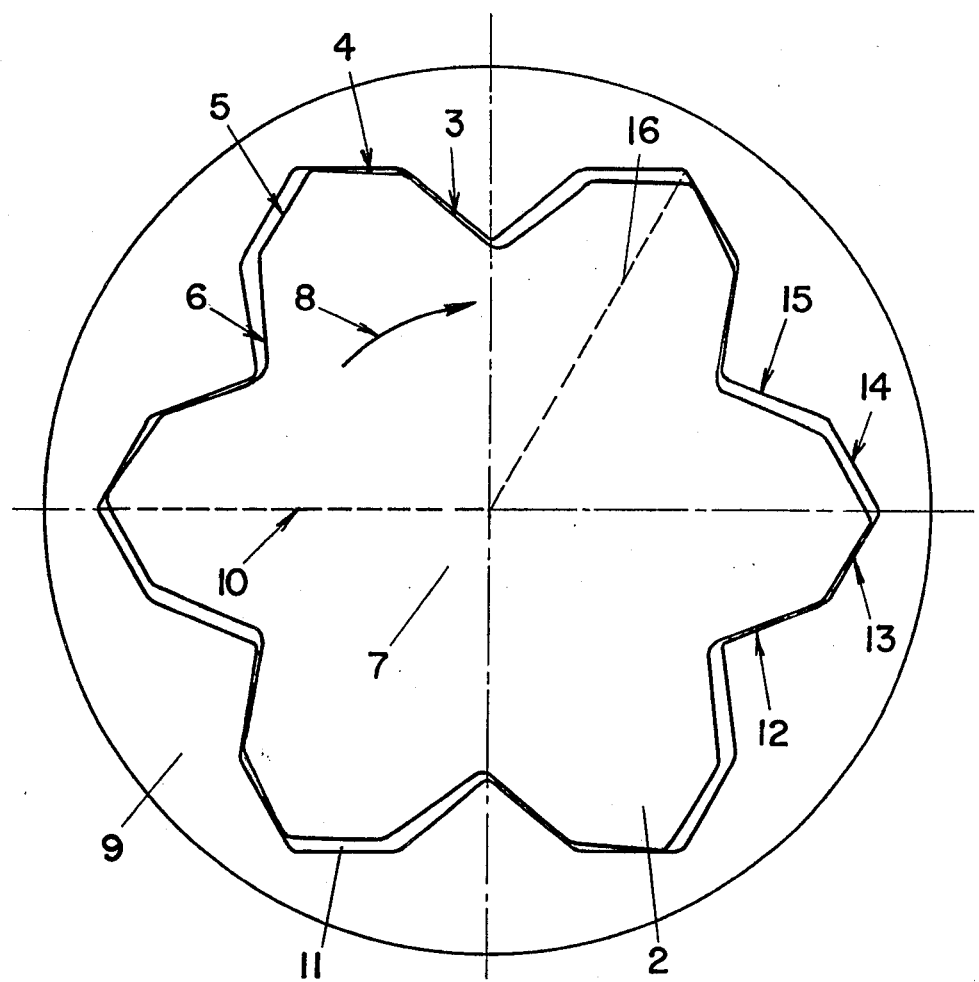
FIG. 3 is a section perpendicular to the axis of rotation of the male and female elements at the moment when the drive torque is produced.

FIG. 3 which shows a section of the driving and driven elements according to a plane perpendicular to the axis of rotation of the assembly, illustrates a male driving organ 7, rotating in the direction indicated by the arrow 8, and driving a female driven organ 9.

The element 7 has six teeth in relief, such as 2, each tooth being provided with flat faces previously described as 3, 4, 5 and 6, which are symmetrical two by two in relation to the bisecting plane 10 of the tooth.

The element 9 is constituted by six teeth in hollow form, or sockets such as 11 for example, each having four flat surfaces 12, 13, 14 and 15 which are symmetrical two by two in relation to the bisecting plane 16.

Figure 4:
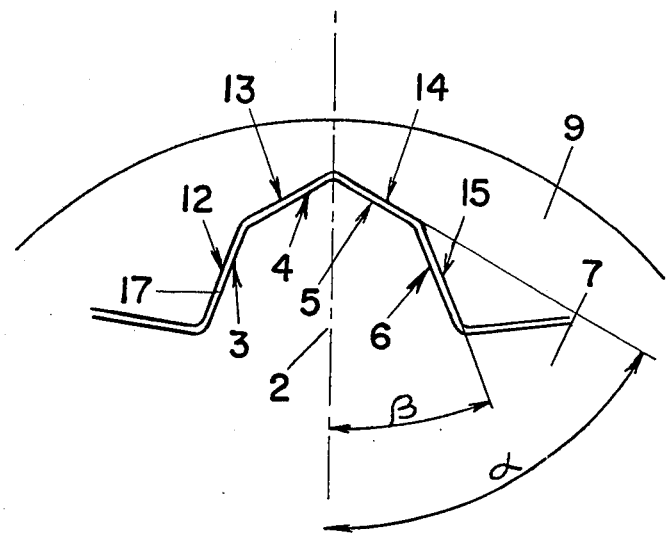
FIG. 4 shows an enlargement of a tooth of the male and socket of the female gear of FIG. 3 in the position of initial engagement.

When the male element 7 is engaged in the female element 9 (FIG. 4), the flat surfaces of the teeth in relief and in hollow form (sockets) are located parallel in relation to one another like 3 and 12. The free space 17 between the opposite surfaces constitutes the manufacturing tolerance of the two elements without which the two elements would have to be engaged by force.

Figure 5:
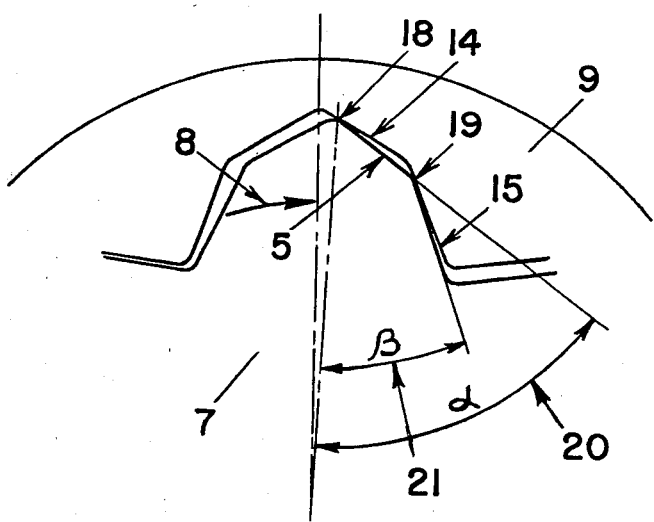
FIG. 5 shows an enlargement of a tooth of the male and female gear of FIG. 3 in position during the transmission of the torque.

When the torque is applied (FIG. 5) to the male element 7, for example according to the arrow 8 indicating the direction of rotation, the surface 5 of the male element comes into contact with the surfaces 14 and 15 of the female element, by the drive generatrices 18 and 19, while the angles of attack $\alpha$ and $\beta$ are marked by 20 and 21.

Therefore, it does in fact happen that the contact between the male and female elements is not produced face against face, but ridge against face.

Figure 6:
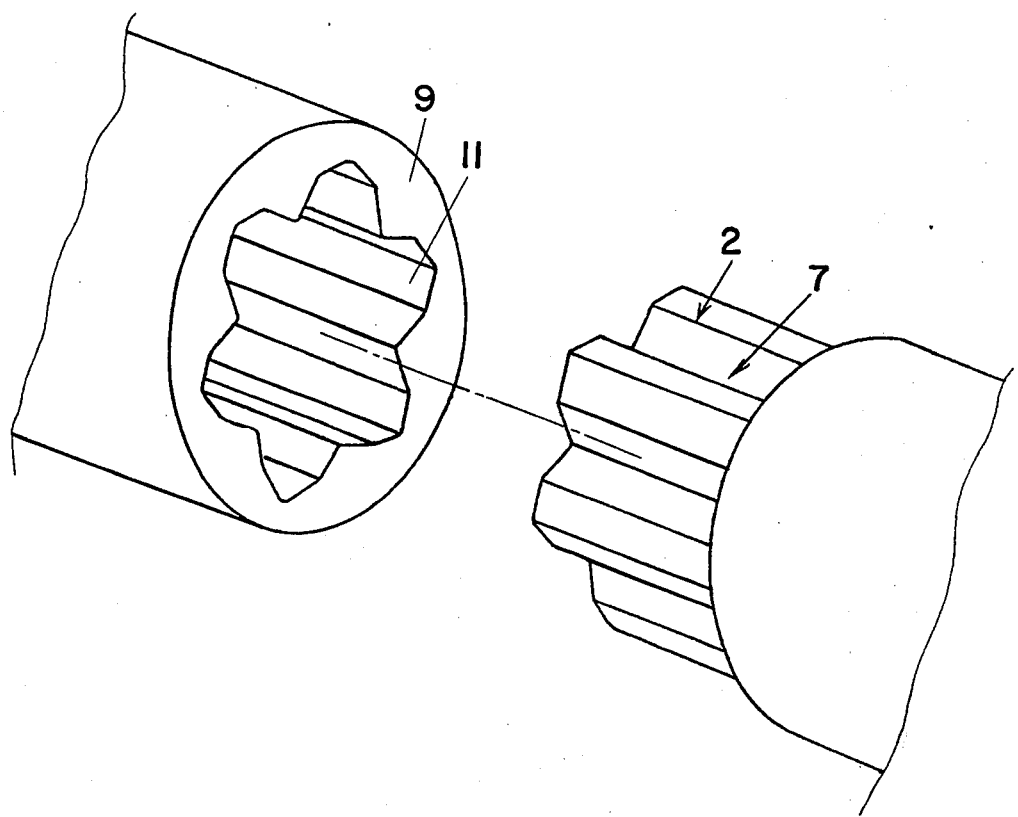
FIG. 6 shows in perspective a screw provided with a female organ in the form of a hollow impression, and the corresponding male drive organ.

FIG. 6 shows an assembly comprising a screw 9 having a hollow impression constituting a female element and key 7, a male element, of the same configuration, the said elements being provided with teeth such as 11 and 2 which engage in such a way as to transmit the motor torque.

In the case of FIGS. 7, 8, 9 and 10, it is important to observe the basic elements which differentiate the coupling according to the invention from those belonging to the prior art.

Figure 7:
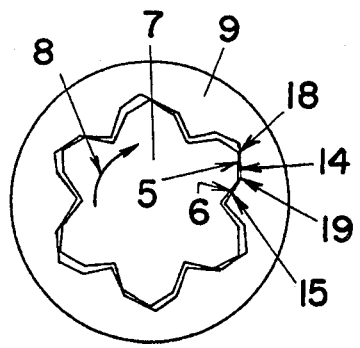
FIG. 7 shows the coupling according to the invention in the torque transmission position.

According to FIG. 7, which shows a section perpendicular to the axis of rotation of the coupling according to the invention, the male element driven by the torque according to the arrow 8, which indicates for example the direction of rotation, comes into contact with the female element 9, by drive generatrices 18 and 19.

By way of contrast, FIGS. 8, 9 and 10 which show sections perpendicular to the axis of rotation of the hexagonal, six-lobed and hexacrenellated couplings, of which the male element 7 is driven by the torque according to the same arrow 8, show very clearly that there is only a single drive generatrix 22 per tooth, arising from the contact of the driven face with the driving face.

FIG. 11 which shows an enlargement of one of the lobes of FIG. 9 shows with extreme precision the existence of a single drive generatrix 22 per lobe, when the male element 7 comes into contact with the element 9 under the action of the drive torque, transmitted for example in accordance with the arrow 8.

The configuration according to the invention is applicable not only to the male head of driven elements, but also to the drive impressions of the female type. The invention is equally applicable to various products including screws, nuts and corresponding tightening keys, and to connectors and other transmission couplings in general, as well as to tools to be used with these connections or couplings, among which we might mention tightening keys, male or female.

I claim:

1. A high performance torque transmitting coupling including a drive element and a driven element, one of said elements having at least two teeth symmetrical in relation to the axis of rotation of the corresponding element and having generatrices parallel to this axis, the second element having at least two sockets symmetrical in relation to the axis of rotation of the corresponding element and having generatrices parallel to this axis, said teeth and sockets each being constituted by flat surfaces symmetrical in relation to their bisecting plane and connected by curved surfaces, characterized in that each tooth and socket is provided with at least four flat surfaces, each tooth being engageable with one of said sockets and, when engaged, providing at least two spaced drive generatrices for a given direction of rotation, the drive generatrices having at least two different angles of attack.

2. A coupling according to claim 1 characterized in that each tooth and socket is provided with, at the most, six flat surfaces, at the most, three drive generatrices for a given direction of rotation and, at the most, three different angles of attack.

3. A coupling according to claim 2 characterized in that the three angles of attack assume the values for $\alpha$ of 58° to 62°, for $\beta$ 25° to 30°, for $\gamma$ 10° to 20°.

4. A coupling according to claim 1 characterized in that when each tooth is provided with four flat surfaces, the two angles of attack assume the values for $\alpha$ of 58° to 62° and for $\beta$ of 10° to 30°.

5. A coupling according to claim 1 characterized in that when each tooth is provided with four flat surfaces, the two angles of attack assume the values for $\alpha$ of 58° to 62° and for $\beta$ of 15° to 25°.

6. A coupling according to claim 1 wherein said teeth and sockets each extend radially relative to the axis of rotation of the corresponding element.

* * * * *